United States Patent Office 3,471,450
Patented Oct. 7, 1969

3,471,450
POLYUREA POLYMERS HAVING CARBONYL ETHYL RADICALS SUBSTITUTED FOR HYDROGEN IN UREA LINKS
Gerhard Müller, Leverkusen, Germany, assignor to Farbenfabriken Bayer Aktiengesellschaft, Leverkusen, Germany, a corporation of Germany
No Drawing. Filed Feb. 14, 1967, Ser. No. 615,907
Claims priority, application Germany, Feb. 16, 1966,
F 48,434
Int. Cl. C08g 22/02
U.S. Cl. 260—77.5  6 Claims

ABSTRACT OF THE DISCLOSURE

A polyurea having carbonyl ethyl radicals substituted on nitrogen atoms of urea linkages and having a molecular weight between about 2,500 and about 300,000. The polyurea may be prepared by reaction of a disecondary amine with a polyisocyanate, phosgene, urea, carbon dioxide, carbon oxysulphide or organic carbonate. It is easily formed into shaped articles and is readily dissolved in solvents. The articles formed are highly flexible and lower melting than the brittle polyureas of the prior art. The polymers are particularly useful in the preparation of films and foils such as electrical insulating foils and lacquers.

This invention relates to polyurea polymers as new compositions of matter, and more particularly to polyurea polymers having the hydrogen atoms attached to nitrogen atoms entirely or partly substituted by carbonyl ethyl groups.

Processes for the production of polyureas from polyvalent amines have been heretofore known but it is often difficult to obtain shaped articles in these processes since polyureas usually have high melting points and are of low solubility. Furthermore, the shaped articles formed are often brittle. Attempts have already been made to improve the solubility of polyureas by using N,N'-dialkyl-diamines but these compounds are usually difficult to prepare.

It is therefore an object of this invention to provide improved polyurea polymers. It is another object of this invention to provide polyureas having high solubility in solvents and lower melting points. It is a further object of this invention to provide films and foils of high flexibility.

The foregoing objects and others which will become apparent from the following description are accomplished in accordance with the invention generally speaking by providing polyurea polymers as new compositions of matter and having the repeating unit

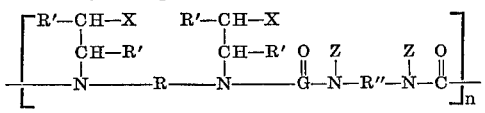

wherein R and R" are the radicals remaining after removal of two primary amino groups from an organic diamine, R' is hydrogen or alkyl; Z is hydrogen, alkyl, cycloalkyl, aralkyl, aryl or

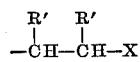

where R' has the same meaning as above and X is an ester group or amide group and $n$ has a value such that the molecular weight of the polymer is within the range of from 2,500 to about 300,000.

The molecular weight of the polymer can be defined by known methods, e.g., a statement of the "intrinsic viscosity." However, the molecular weight of the polyureas according to the invention is generally within the range of at least 2,500 and preferably about 5,000 to 300,000, preferably to 200,000.

In the formula represented R and R" are radicals remaining after removal of two primary amino groups from an organic diamine and may be aliphatic, cycloaliphatic, aralphatic, aromatic or heterocyclic such as those radicals obtained by removing the two primary amino groups from organic diamines, such as, for example, ethylene diamine, 1,4-diaminobutane, 1,6-diaminohexane, 1,2-diaminopropane, bis-(3-aminopropyl)-amine, di-(2-amino-ethyl)-ether, di-(2-aminoethyl)-sulphide, di-(2-aminoethyl)-sulphone, pentaethylenehexamine, hexahydro-p-phenylenediamine-(1,2), -(1,3) and -(1,4), 4,4'-diamino-dicyclohexyl-methane, hexahydro-2,4- and 2,6-diamino-toluene, 4,4'-diamino-dicyclohexylether, 4,4'-diamino-dicyclohexylsulphide,4,4' -diamino-dicyclohexylether-sulphone, dodecahydro-benzidine, xylene-diamine-(1,3) and -(1,4), o-, m- and p-phenylenediamine, 4,4'-diamino-diphenylmethane, 4,4'-diamino-diphenylether, 4,4'-diamino-diphenylsulphide, 4,4'-diamino-diphenylsulphone, benzidine, 4-nitrophenylene diamine - (1,2),4 - chlorophenylenediamine-(1,3), 2-chlorophenylenediamine-(1,4), 2,5-dichloro-phenlyene-diamine-(1,4), 5 - nitro-2,4-diamino-1-methyl-benzene, 2,6-diamino-5-methyl-1,3-diethylbenzene, hexahydro-4,4'-diamino-diphenylmethane, naphthylene diamine-(1,2), -(1,4), -(1,8), -(1,5), -(2,3) and -(2,7), 1,5-diaminoanthraquinone, 4,4'-diaminoazobenzene, 4,4'-diamino-benzophenone, diaminocarbazole, 2,4-diamino-6-phenyltriazine-(1,3,5), and the like.

R' is hydrogen or alkyl such as, for example, methyl, ethyl, propyl, butyl, isopropyl, isobutyl, hexyl and the like. Z is hydrogen or alkyl such as, for example, methyl, chloromethyl, ethyl bromoethyl, butyl, propyl nitrobutyl, hexyl and the like; cycloalkyl such as, for example, cyclopentane, cyclohexane, chlorocyclohexane, cycloheptane, nitrohexane and the like; aralkyl such as benzyl, xylyl, bromoxylyl, phenylethyl, phenylpropyl, naphthylhexyl and the like; aryl such as phenyl, chlorophenyl, dichlorophenyl, naphthyl, tolyl, nitrophenyl, diphenyl and the like; or

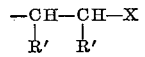

where R' has the meaning given above and X is an ester group such as, for example, alkoxycarbonyl, such as, for example, methoxycarbonyl, ethoxycarbonyl, n-propoxycarbonyl, isopropoxycarbonyl, n-butylcarbonyl, isobutoxycarbonyl, hexoxycarbonyl, heptoxycarbonyl, decoxycarbonyl, cyclohexoxycarbonyl, allyloxycarbonyl; aryloxycarbonyl such as phenoxycarbonyl, cresoxycarbonyl, naphthoxycarbonyl and the like; aminocarbonyl; alkylaminocarbonyl such as N-methylaminocarbonyl, N-ethylaminocarbonyl, N,N-dibutylaminocarbonyl, N - methyl-N-butylaminocarbonyl, N-hexylaminocarbonyl and the like; arylaminocarbonyls such as N-phenylaminocarbonyl, p-chlorophenylaminocarbonyl, toluylaminocarbonyl, naphthylaminocarbonyl and the like. The ester group represented by X and the specific examples has the formula —COOR$_1$ wherein R$_1$ is alkyl, cycloalkyl, allyl or aroxy. The amide group represented by X and the specific examples has the formula —CONR$_2$R$_3$ wherein R$_2$ and R$_3$ are the same or different and are hydrogen, alkyl or aryl.

The polyurea polymers in accordance with the invention can be prepared by a variety of techniques utilizing disecondary amines of the formula

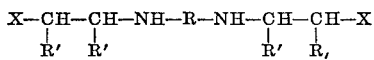

wherein R, R′ and X have the meaning set forth above.

The disecondary amine to be used according to the invention as starting material can be obtained very simply by the addition of acrylic acid derivatives

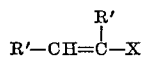

to a diprimary amine

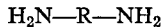

where R′, R and X have the same meaning set forth above. Any of the diamines mentioned above may be used in reaction with the acrylic acid derivative to prepare the disecondary diamines. Any suitable acid derivatives such as the esters and amides of for example, acrylic acid, methacrylic acid, crotonic acid, tiglic acid, buten-(2)-oic acid, penten-(2)-oic acid, hexen-(2)-oic acid, hepten-(2)-oic acid of decen-(2)-oic acid and the like may be used. Any suitable ester of these acid compounds may be used such as, for example, the methylester, ethylester, n-propylester, i-propylester, n-butylester, i-butylester, hexylester, heptylester, decylester, cyclohexylester, allylester, phenylester, cresylester, naphthylester and the like. Any suitable amides of the above-mentioned acids may be used such as the N-methylamides, N,N-dimethylamides, N-ethylamides, N-butylamides, N,N-dibutylamides, N-methyl-N-butylamides, N-hexylamides, anilides, p-chloroanilides and toluidides.

The polyureau polymers in accordance with the invention are prepared from the diamines of the formula above, by reaction with phosgene, urea, carbon dioxide, carbon oxysulphide, organic carbonates or polyisocyanates, or undergo surface boundary condensation with biscarbamic acid chloride. Any suitable organic carbonates such as, for example, diethyl carbonate, dibutyl carbonate, diphenyl carbonate, dinaphthyl carbonate, dicresyl carbonate and dicyclohexyl carbonate and the like may be used.

Any suitable polyisocyanates may be used such as, for example, aliphatic diisocyanates such as diisocyanates of ethane, butane, hexane and heptane as well as aliphatic diisocynates linked through ring systems, such as ω,ω′-diisocyanato-1,3-dimethyl-benzene, ω,ω′-diisocyanato-1,4-dimethyl-cyclohexane, ω,ω′-diisocyanato-1,4-diethyl-benzene and cyclohexane-1,3, cyclohexane-1,4, 1-methyl-cyclohexane-2,4-, dicyclohexylmethane - 4,4′ - diisocyanate and the like; mixed aromatic-aliphatic and aromatic-hydroaromatic diisocyanates such as methylisocyanato-4-phenylisocyanate, tetrahydronaphthylene - 1,5 - diisocyanate, hexahydrodiphenyl - 4,4′ - diisocyanate, hexahydrodiphenylmethane-4,4′-diisocyanate and the like; aromatic diisocyanates such as, 1,3-phenylene-diisocyanate, 1,4-phenylene-diisocyanate, 1-methylbenzene-2,4-diisocyanate and 1-methylbenzene-2,6-diisocyanate as well as their isomeric mixtures, mono-, di- and triisopropylbenzyl-diisocyanates, naphthalene-1,4-diisocyanate, naphthalene-1,5-diisocyanate, diphenyl-4,4′-diisocyanate, diphenylmethane-4,4′-diisocyanate, anthraquinone-2,6-diisocyanate, diphenylsulphide-2,4-diisocyanate, diphenylether-4,4′ - diisocyanate, diphenylcarbonate-4,4′-diisocyanate, benzophenone-4,4′-diisocyanate and the like. The isocyanates used according to the invention may also be substituted by halogen, alkoxy, azo, nitro, cyano, ester or sulphone groups such as, 1-chlorobenzene-2,4-diisocyanate, 1-nitro-2,4-benzene-diisocyanate, 1-methoxybenzene - 2,4 - diisocyanate, azobenzene-4,4′-diisocyanate, diphenylsulphone-4,4′-diiso-cyanate and the like. It is also possible to use masked diisocyanates, i.e., the reaction products of the above isocyanates with components which are fairly readily split off again by heat, such as phenols, bisulphites, malonic esters, ε-caprolactam, χ-pyrrolidone or compounds which have active methylene groups.

The above-mentioned polyisocyanates correspond to the general formula OCN—R″—NCO. It is also possible to use polyisocyanates of higher functionality such as triphenylmethane-4,4′,4″-triisocyanate, triisocyanato - phenyl-thiophosphoric acid esters or the reaction products of 3 mols of toluylene diisocyanate with 1 mol of trimethylol propane, which products lead to branching and cross-linking in the products of the process.

The bis-carbamic acid chlorides mentioned above correspond in formula to that given for the preferred isocyanates except that the two NCO-groups are replaced by NHCOCl groups. They may be used in the preparation of polyureas by surface boundary condensation with the diamines to be reacted according to the invention.

Although it is preferable to carry out the process of the invention with the use of polyisocyanates as described above, in the other processes mentioned it is possible to use other known diamines for modification of the polyureas, e.g., diamines of the formula Z—NH—R″—NH—Z (with the meanings indicated above), in a molar ratio of about 1:1. Suitable examples are the addition products with primary amines of esters, (substituted) amides and nitriles of acrylic acid, of methacrylic acid, of crotonic acid, of tiglic acid, of buten-(2)-oic acid, of penten-(2)-oic acid, of hexen-(2)-oic acid, of hepten-(2)-oic acid and of decen-(2)-oic acid. These acids are esterified by, for example, methyl-, ethyl-, n-propyl, i-propyl-, n-butyl-, i-butyl-, tertiary butyl-, hexyl, heptyl-, decyl-, cyclohexyl-, allyl-, phenyl-, cresyl-, or naphthyl-groups, or one can use corresponding amides, N-methylamides, N,N-dimethylamides, N-ethylamides, N-butylamides, N,N-dibutylamides, N-methyl-N-butylamides, N-hexylamides, anilides, p-chloroanilides and toluidides. In addition to the diprimary diamines of the general formula NH$_2$—R—NH$_2$ one may use their N-alkyl-N-cycloalkyl-, N-aralkyl-, N-aryl- or N,N′-dialkyl-, N,N′-dicycloalky-, N,N′-diarakyl, N,N′-diaryl, N-alkyl-N′-aryl-, N-alkyl-N′-cycloalkyl- or N-aryl-N′-cycloalky derivatives. Examples of the last-mentioned diamine derivatives are N,N′-dimethylethylene-diamine, N,N-dimethylphenylene-diamine-(1,3) and -(1,4), N,N′-diethyl-phenylenediamine-(1,4)- and N-cyclohexyl-phenylene-diamine-(1,4) as well as their hydroxyethylation products, hydroxypropylation products and the methylol derivatives of the diamines.

The disecondary amines can be reacted with polyisocyanates in anhydrous solvents such as dimethylformamide, dimethylacetamide, N - methylpyrrolidone, dimethylsulphoxide, cresols, cyclohexane, glycol monomethylether acetate, dioxane, propiophenone, xylene or mixtures thereof and the like. In other cases, e.g., when disecondary amines are reacted with organic carbonates, especially diphenylcarbonate, preparation of the polyureas may be carried out without solvents.

Whereas the reaction of the disecondary amines with carbon oxysulphide, phosgene or polyisocyanates will take place at room temperature or slightly elevated temperatures, e.g., at 15 to 100° C. and preferably at 20 to 80° C., higher temperatures, e.g., 100 to 250° C. and preferably 100 to 220° C. are required for the reaction with carbon dioxide, organic carbonates or urea. Furthermore, in the reaction with carbon dioxide, it is advisable to use the latter in excess at elevated pressures, e.g., 500 to 2,000 atmospheres. In the reaction of the disecondary amines with phosgene, polyisocyanates, organic carbonates or ureas, approximately equimolar quantities should be used although one or other component may be used in a slight excess, of up to 0.1 mol per mol over the other component, for the purpose, for example, of controlling the size of the molecule.

When bis-carbamic acid chlorides are reacted with the disecondary amines used according to the invention, the reactants, in equimolar quantities, are vigorously stirred together at room temperature in a mixture of water and an organic solvent which is immiscible with water, e.g., chloroform.

Instead of causing the products of the process to undergo cross-linking by adding polyfunctional components, e.g., up to about 10% triisocyanates, cross-linking can also be effected by reacting formaldehyde or compounds which liberate formaldehyde, such as trioxane, with the substantially linear polyurea which must still contain free amide hydrogen.

The products of the process can be worked up into fibers, filaments, films, foils and other shaped articles which have a wide range of application. The working up process may be carried out in such a way that the formation of the polyureas takes place only during the shaping process. Some of these polyureas have such low melting points that they can be shaped direct from the melt. If the melting points are too high for shaping in the melt, it is possible to prepare solutions from which the shaped articles are then produced. The polyureas are generally readily soluble in solvents such as alcohols, (halogenated) hydrocarbons, esters, ketones, (substituted) amides, ethers, phenols and/or mixtures thereof, e.g., benzyl alcohol, xylene, chlorobenzene, cresol, glycol monomethylether acetate, acetophenone, propiophenone, methylbutylketone, acetone, ethylacetate, tetrahydrofuran, dioxane, dimethylformamide, dimethylacetamide, N-methylpyrrolidone, formamide, dimethylsulphoxide, tetramethylene sulphone or butyrolactone.

Films and foils obtained from the products of the process are completely transparent, colorless and highly flexible. They, therefore, have numerous applications in fields in which high flexibility is desired, for example in the lacquer industry or in the production of insulating lacquers for electrical products. Another field of application of the polyureas is their use as self-supporting electrical insulating foils. In this form they may be used, for example, for insulating the cores and layers of electric coils, for insulating grooves in the construction of electrical machinery and for insulating cables. They are also suitable as dielectric materials, in which case they may be coated with aluminum or zinc and used in the production of condensers.

The invention will be further illustrated by the following examples in which parts are by weight unless otherwise specified.

EXAMPLE 1

Preparation of the starting material

About 84 parts of 4,4'-diamino-dicyclohexylmethane are added dropwise at room temperature in the course of 4 to 5 hours to a solution of about 102.4 parts of butyl acrylate in about 1,000 parts by volume of distilled dimethyl formamide. The reaction mixture is left to stand at room temperature for about 24 hours.

Process of the invention

About 100 parts of diphenylmethane-4,4'-diisocyanate are introduced in portions into the starting material thus obtained in the course of about 3 hours at room temperature. The reaction mixture is then heated for about 8 hours at about 50° C. and a pale, viscous solution of a polyurea is obtained.

Foils are cast on to glass plates from this solution, and dried for about 90 minutes at about 80° C. The foils are then detached from the plate and heated for about 2 hours at about 80° C. by suspending them in a circulating air oven. The polyurea foils obtained are colorless, completely transparent and highly flexible.

They have the following properties:

Heat resistance, degrees _____ 173
Tensile strength, kp./mm.$^2$ _____ 10
Stretching, percent _____ 16

Stretching tests carried out on the polyurea foils show that the tensile strength of the foils increases in the course of the stretching.

EXAMPLE 2

About 69.6 parts of toluylene-2,4-diisocyanate are added dropwise at room temperature in the course of about 3 hours to a diamine obtained as in Example 1 from about 102.4 parts of butyl acrylate and about 84 parts of 4,4'-diamino-dicyclohexylmethane in about 1,000 parts by volume of distilled dimethylformamide. The components are left to react for about 8 hours at about 50° C. and a viscous, pale yellow polyurea solution is obtained.

Foils produced from this product, by the method described in Example 1 are colorless, transparent and highly elastic. They have the following properties:

Heat resistance, degrees _____ 174
Tensile strength, kp./mm.$^2$ _____ 8.6
Stretching, percent _____ 14

EXAMPLE 3

About 100 parts diphenylmethane-4,4'-diisocyanate are added in portions at room temperature in the course of about 3 hours to a diamine in solution obtained as described in Example 1 from about 68.8 parts of methyl acrylate and about 84.0 parts of 4,4'diamino-dicyclohexylmethane in about 1,000 parts by volume of distilled dimethylformamide. The components are then left to react for about 8 hours at about 50° C. and a pale yellow, viscous polyurea solution is obtained.

Foils prepared from this by the method described in Example 1, after a preliminary drying at about 100° C. for about 90 minutes followed by about 2½ hours' heating in a circulating air oven at about 120° C. have the following properties:

Heat resistance, degrees _____ 180
Tensile strength, kp./mm.$^2$ _____ 8.4
Stretching, percent _____ 9

In addition, the polyurea solution is applied in a thin layer on a sheet metal which is then heated for about 2 hours at about 120° C. in a circulating air oven. The coatings obtained in this way are colorless and elastic and have good adhesion. They are resistant to solvents such as ethanol, methanol, acetone, ethyl acetate and tetrahydrofuran.

EXAMPLE 4

About 100 parts of diphenylmethane-4,4'-diisocyanate are added in portions at room temperature in the course of about 3 hours to a diamine in a solution obtained, as in Example 1, from about 68.8 parts of methylacrylate and about 45.6 parts hexahydro-p-phenylenediamine in about 1,200 parts by volume of dimethylformamide. The components are then left to react for a further 2 hours at about 50° C. and a viscous, pale polyurea solution is obtained.

Foils are produced from this polyurea solution by the method described in Example 3. They are colorless, transparent and very flexible and have the following properties:

Heat resistance, degrees _____ 184
Tensile strength, kp./mm.$^2$ _____ 10.2
Stretching, percent _____ 11.5

EXAMPLE 5

Preparation of starting material

A solution of about 114 parts of hexahydro-p-phenyleneadiamine in about 300 parts by volume of methanol are slowly added dropwise at room temperature, to about 172 parts of distilled methyl acrylate. The reaction mixture is left to stand at room temperature for about 24 hours and the solvent is then distilled off in a vacuum at about 50° C. The addition product is initially obtained in liquid form in a quantitative yield. It crystallizes out on standing. The crystals are removed by suction, washed with cyclohexane and dried. They are colorless and melt at about 50° C. The liquid component cannot be distilled.

*Analysis.*—Calculated: C, 58.8%; H, 9.1%; N, 9.8%. Found: C, 57.50%; H, 9.07%; N, 10.03%.

Process of the invention

About 50 parts of diphenylmethane-4,4'-diisocyanate are added in portions to a solution of about 57.2 parts of the crystallized addition product, in 600 parts by volume of distilled dimethylformamide at room temperature. The components are left to react for about 8 hours at about 50° C. and a colorless, viscous polyurea solution is obtained.

This solution can be used directly for coating copper conductors. In this process, the copper wire passes vertically upwards through a bath containing the lacquer solution and is thus coated with the liquid lacquer. The excess is stripped off at metal stripper nozzles, which are usually provided for this purpose above the lacquer bath. The coated wire is then passed through a baking oven in which the heat causes the solvent to evaporate and the wire coating is cured. This process is repeated several times until the coating layer has the necessary thickness. This is usually achieved after 6 to 8 treatments.

The length of the oven is 4 m., the oven temperature 300° C. and the speed of the wire 5 to 7 m. per minute. The copper wire has a thickness of 0.7 mm. By lacquering the wire six times, an increase in diameter of about 60$\mu$ is obtained, i.e., the film of lacquer has a thickness of about 30$\mu$.

When tested for scrape resistance (NEMA or DIN 46453), the lacquer wire obtained is found to withstand about 50 up and down strokes.

The wire is found to have excellent winding strength around a mandrel of 0.7 mm. diameter even if it has previously been stretched by about 20% of its original length. This corresponds to a stretching of the outer fiber by 80%.

When the wire is wound around a mandrel of diameter 0.7 mm. and this so-called winding curl is subjected to a heat shock treatment by placing it in a heating cupboard heated to a temperature of 180° C., no tears or cracks can be found in the lacquer film after 60 minutes even when examined under a lens of 10-fold magnification (DIN 46453). The softening temperature, determined according to DIN 46453, is in the region of 200 to 250° C. The dielectric strength, determined on twisted wire samples (DIN 46453), is found to be 7.5–8.5 kv.

The hardness of the lacquer film is 4H (DIN 46453) and after treatment in alcohol at about 50° C. for about 30 minutes it is unchanged.

The wire can be bent under water around a mandrel of diameter 10 mm. No tears are formed in this treatment, as can be seen from the fact that when a direct voltage of 100 volt is applied to the copper wire and water bath, no contact is made and the test lamp connected between them does not light up.

EXAMPLE 6

Preparation of the starting material

A solution of about 105 parts of 4, 4'-diamino-dicyclohexylmethane in about 300 parts by volume of methanol is added dropwise to about 86.0 parts of distilled methyl acrylate. The reactants are left to stand at room temperature for about 24 hours and the solvent is then removed in vacuo about 50° C. The residue, which is at first liquid, almost completely crystallizes after some time. After recrystallization from cleaning petrol, an addition product of the following structure

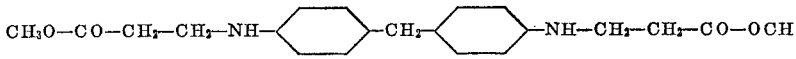

is obtained as colorless crystals (melting point 53° C.; yield 95 parts).

*Analysis.*—Calculated for $C_{21}H_{38}N_2C_4$: C, 66.0%; H, 9.95%; N, 7.33%; O, 16.75%. Found: C, 66.19%; H, 10.98%; N, 7.26%; O, 16.70%.

The IR spectrum confirms the structure of the addition product.

Reaction according to the invention

About 25 parts of diphenylmethane-4,4'-diisocyanate are added in portions at room temperature to a solution of about 38.2 parts of the crystallized addition product in 300 parts by volume of distilled N-methylpyrrolidone. The reaction mixture is then stirred for about 4 hours at about 50° C. and a solution of the same polyurea as in Example 3 is obtained.

Foils are cast on to a glass plate and dried for about one hour in a vacuum at about 50° C. They are then removed from the plates and fixed over a steel plate with magnets which keep the edges down and then heated in a vacuum at about 120° C. for about 2 hours. The properties of the foils obtained are similar to those of the product of Example 3.

EXAMPLE 7

Preparation of the starting materials

About 198 parts of 4, 4'-diamino-diphenylmethane and about 200 parts of distilled methyl acrylate are heated under reflux for about 15 hours in the presence of about 5 parts by volume of glacial acetic acid. The readily volatile constituents are then distilled off in vacuo at 60 to 70° C. and the viscous residue (380 parts) is dissolved in about 1,000 parts of a commercial cresol mixture.

Reaction according to the invention

About 174 parts of toluylene-2,4-diisocyanate are added dropwise at about 50° C. in the course of about 3 hours to the cresol solution. Stirring is then continued for about 10 hours at about 150° C. and a homogeneous, viscous polyurea solution is obtained.

This lacquer mixture is used for lacquering a copper wire of 0.7 mm. thickness by the procedure described in Example 5 and a dark colored lacquer coating is obtained.

Tests on this lacquer wire again give good results. Both the winding strength and the heat shock response are good. The resistance to scratching is about 50 to 60 up and down strokes (tested according to NEMA). Softening takes place at temperatures between 200 and 250° C., and the test for dielectric strength gives values of 7 to 8 kv. The pencil hardness is found to be 4H and after storage in alcohol at 50° C. for 30 minutes, 2–3H. Relatively good resistance to aging is found, i.e., these values are substantially maintained, after storage in a heating cupboard at 130° C. for 100 hours.

EXAMPLE 8

Preparation of the starting material

About 105 parts of 4,4'-diamino-dicyclohexylmethane are added dropwise at room temperature, in the course of about 4 hours, to a solution of about 157 parts of freshly distilled dimethylaminoethyl methacrylate in about 1,000 parts by volume of dimethylsulphoxide.

Reaction according to the invention

When the solution has been left to stand for about 24 hours, about 87 parts of toluylene-2,4-diisocyanate are slowly added dropwise, at room temperature. The reaction is left to continue for about 8 hours at about 50° C. and a viscous solution of the polyurea is obtained. Foils are cast from a viscous solution with the use of a wiper blade with a 0.254 mm. aperture and dried for 2 hours at 120° C. Satisfactory self-supporting foils are obtained by this process.

EXAMPLE 9

About 46.6 parts of an addition product of butyl acrylate and 4,4-diamino-dicyclohexylmethane are heated for about 12 hours at about 150° C. with about 22.6 parts of 4,4'-di-(methylamino)-diphenylmethane and about 21.4 parts of diphenyl carbonate, first under suction, and then under a vacuum of 0.1–0.5 mm. Hg. The polyurea obtained is dissolved in about 250 parts by volume of a mixture of dimethylacetamide/xylene (2:1). This solution is used for direct lacquering of copper wires of 0.7 mm. diameter. The wire lacquers obtained have satisfactory properties.

EXAMPLE 10

Preparation of the starting material

A solution of about 21 parts of 4,4'-diamino-dicyclohexylmethane in about 80 parts by volume of cyclohexanone is slowly added dropwise at room temperature to a solution of about 25.6 parts of butyl acrylate in about 100 parts by volume of cyclohexanone, and the mixture is left to stand for 24 hours.

Process according to the invention

About 17.4 parts of toluylene-2,4-diisocyanate are added dropwise to this solution at about 40° C. in the course of about 3 hours. The reaction is left to continue for about 8 hours at about 40° C. and the precipitated polyurea is then filtered off, washed with acetone and dried in vacuo at 50° C. The polyurea is obtained in a yield of about 61 parts.

The polyurea prepared in this way is readily soluble in relatively strongly polar solvents such as dimethylformamide, dimethylsulphoxide, N-methylpyrrolidone or dimethylacetamide, or in solvent mixtures containing these strongly polar solvents. Viscous polyurea solutions are obtained which are cast into foils and dried at 120° C. The polyurea foils produced in this way are distinguished by their clearness, flexibility and resistance to tearing.

EXAMPLE 11

Preparation of the starting material

N,N'-di-(butoxycarbonylethyl)-ethylene-diamine is prepared by the addition of about 60 parts of ethylene diamine to about 256 parts of butyl acrylate at room temperature.

Reaction according to the invention

About 63.2 parts of this secondary amine and about 21.4 parts of diphenylcarbonate are first heated for about 5 hours at about 150° C. at normal pressure, in an atmosphere of nitrogen for about 5 hours at about 150° C. in a water jet vacuum and finally for about 5 hours at about 150° C. under a pressure of 0.1 to 1 mm. Hg. Phenol distills off in the process. A yellow polyurea resin is obtained which is hard at room temperature, and dissolves in benzyl alcohol to give a yellow solution. This solution is suitable for the production of polyurea lacquers by stove lacquering at 100° C.

EXAMPLE 12

About 50 parts of a disecondary amine prepared in a manner analogous to that employed in Example 11 by the addition of about 60 parts of ethylene diamine to about 256 parts of butyl acrylate, is charged with carbon dioxide in a dry autoclave to give a carbon dioxide pressure of at least 500 atmospheres when the temperature is raised to about 180° C. The reaction is left to proceed for about 8 hours and a polyurea soluble in benzyl alcohol or cresol is obtained. This polyurea can also be dissolved in dimethylformamide and spun wet with the use of water as precipitating agent.

EXAMPLE 13

An emulsion of about 23.2 parts of an addition product prepared by the addition of about 60 parts of ethylene diamine to about 172 parts of methyl acrylate and about 100 parts by volume of water is vigorously mixed with a solution of about 24.1 parts of hexamethylene-1,6-bis-carbamic acid chloride in about 100 parts by volume of carbon tetrachloride. A polyurea separates in the form of a solid. Foils prepared from solutions of this polyurea in N-methylpyrrolidone at about 100° C. are transparent, colorless and flexible.

EXAMPLE 14

About 23.2 parts of an addition product of ethylene diamine and methyl acrylate prepared in a manner analogous to Example 13 are dissolved in about 250 parts by volume of pure toluene in an atmosphere of nitrogen. Carbon oxysulphide is introduced into this solution with stirring. After about one hour, the crystals which have separated are removed by suction, washed with toluene and dried over silica gel in vacuo. The crystalline product is polycondensed by heating it for about 3 hours in vacuo at about 80° C. and then for another 2 hours at 110° C. A solution of this polyurea in cresol yields colorless, flexible films when stoved on copper sheet for 2 hours at 150° C.

EXAMPLE 15

The polyurea prepared in Example 9 may also be prepared by heating the reaction components with about 6 parts of urea instead of with diphenylcarbonate for 10 hours at 150° C. in an atmosphere of nitrogen. The polyurea obtained in this way is suitable for the direct lacquering of copper wires from cresol solution.

It is, of course, to be understood that the reactants used in the examples are for illustrative purposes and that any of the materials set forth above may be substituted for the one use specifically.

Although the invention has been described in considerable detail for the purpose of illustration, it is to be understood that variations can be made by those skilled in the art without departing from the spirit of the invention and scope of the claims.

I claim:

1. As a new composition of matter, a polymer having a molecular weight of from about 2,500 to about 300,000 and having the repeating unit

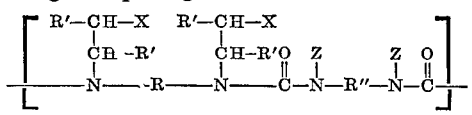

wherein R and R" are the radicals remaining after removal of two primary amino groups from an organic diamine; R' is hydrogen or alkyl; Z is hydrogen, alkyl, cycloalkyl, aralkyl, aryl or

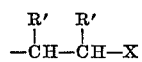

where R' has the same meaning as above and X is —COOR" or —CNR$_2$R$_3$ wherein R" is alkyl, cycloalkyl, allyl or aroxy; R$_2$ and R$_3$ are the same or different and are hydrogen, alkyl or aryl.

2. The composition of claim 1 wherein X is alkoxycarbonyl, aryloxycarbonyl, aminocarbonyl, alkylaminocarbonyl or arylaminocarbonyl.

3. The product of claim 1 wherein R' and Z are hydrogen, and X is the ester group.

4. The product of claim 1 wherein R' and Z are hydrogen, and X is the amide group.

5. The product of claim 1 wherein R' is lower alkyl and Z is hydrogen.

6. A fiber, film or foil formed from the polymer of claim 1.

References Cited

UNITED STATES PATENTS

| | | | |
|---|---|---|---|
| 2,464,519 | 3/1949 | Lichty et al. | 260—468 |
| 2,929,800 | 3/1960 | Hill | 260—77.5 |
| 2,957,844 | 10/1960 | Wesp | 260—42 |
| 3,158,586 | 11/1964 | Krause | 260—40 |
| 3,247,163 | 4/1966 | Reinking | 260—47 |
| 3,318,849 | 5/1967 | Mosely et al. | 260—77.5 |
| 3,365,412 | 1/1968 | Thoma et al. | 260—32.6 |

FOREIGN PATENTS 1,069,195  5/1967  Great Britain.

HOSEA E. TAYLOR, JR., Primary Examiner

H. S. COCKERAM, Assistant Examiner

U.S. Cl. X.R.

117—128; 252—63.7